United States Patent [19]

Moriya et al.

[11] Patent Number: 4,978,226

[45] Date of Patent: Dec. 18, 1990

[54] DIGITAL COLOR COPYING MACHINE FOR COMPOSING AND CONTROLLING THE COLOR OF A COMPOSED IMAGE

[75] Inventors: Shigeru Moriya; Keiji Nakatani, both of Osaka, Japan

[73] Assignee: Minolta Camera Kabushiki Kaisha, Osaka, Japan

[21] Appl. No.: 321,405

[22] Filed: Mar. 10, 1989

[30] Foreign Application Priority Data

| Mar. 11, 1988 | [JP] | Japan | 63-59039 |
| Mar. 11, 1988 | [JP] | Japan | 63-59040 |
| Mar. 11, 1988 | [JP] | Japan | 63-59041 |
| Mar. 11, 1988 | [JP] | Japan | 63-59042 |
| Mar. 11, 1988 | [JP] | Japan | 63-59043 |
| Mar. 11, 1988 | [JP] | Japan | 63-59044 |

[51] Int. Cl.$^5$ ............................................. H04N 1/40
[52] U.S. Cl. ............................................ 358/76; 358/75
[58] Field of Search ............... 358/75, 75 IJ, 76, 77, 358/78, 80, 406, 443, 448, 450, 451, 452, 453

[56] References Cited

U.S. PATENT DOCUMENTS

| 3,489,849 | 1/1970 | Hedger | 358/406 |
| 4,032,969 | 6/1977 | Ueda | 358/80 |
| 4,270,146 | 5/1981 | Adachi | 358/450 |
| 4,275,958 | 6/1981 | Tachika et al. | 355/326 |
| 4,387,297 | 6/1983 | Swartz et al. | |
| 4,417,805 | 11/1983 | Kishi | 358/453 |
| 4,603,262 | 7/1986 | Eastman et al. | |
| 4,642,699 | 2/1987 | Ohi | 358/450 |
| 4,674,861 | 6/1987 | Kawamura | 358/75 |
| 4,755,852 | 7/1988 | Fujita | 355/208 |
| 4,794,419 | 12/1988 | Shibazaki et al. | |
| 4,825,246 | 4/1989 | Fukuchi et al. | |
| 4,839,722 | 6/1989 | Barry et al. | 358/80 |
| 4,870,506 | 9/1989 | Nakauchi | 358/75 |
| 4,876,571 | 10/1989 | Nakamura et al. | |

FOREIGN PATENT DOCUMENTS

| 49-131317 | 12/1974 | Japan . |
| 54-104834 | 8/1979 | Japan . |
| 55-123270 | 9/1980 | Japan . |
| 56-83757 | 7/1981 | Japan . |
| 57-61372 | 4/1982 | Japan . |
| 60-216670 | 10/1985 | Japan . |
| 60-239764 | 11/1985 | Japan . |

Primary Examiner—James J. Groody
Assistant Examiner—Mark R. Powell
Attorney, Agent, or Firm—Burns, Doane, Swecker & Mathis

[57] ABSTRACT

A digital color copying machine provides for setting a specific area of an original document and storing image data of the specific area with respect to gradation of color of the original document. The color of the image data contained in the image memory can be compensated by iteration of the color image forming process. A plurality of images, each having a differently compensated color can be provided in different positions on one of the copy sheets as transferred from the original document.

38 Claims, 13 Drawing Sheets

DIGITAL COLOR COPYING MACHINE FOR COMPOSING AND CONTROLLING THE COLOR OF A COMPOSED IMAGE

BACKGROUND OF THE INVENTION

1. Field of the Invention

The present invention relates to a digital color copying machine capable of composing an image and controlling the color of the composed image with ease.

2. Description of the Prior Art

A digital color copying machine has been known in public in the prior art, in which an image data signal of an original document taken by image taking elements is converted into a digital form image data signal and is printed to be formed on a sheet by an electronic photographic method in correspondence to the image data signal of digital form.

In a digital color copying machine, a color reproduction ability is the most important point of the performance, i.e., it is most important to make the color of a copied image as similar as possible to that of the image of the original document. Even in case there appears little difference between the color of the copied image and the color of the original document in one time copying operation, when a recopying operation, so called a generation copying operation, is performed by copying the image formed by the previous copying operation as the original document, there occurs a large difference between the color of the recopied image and the color of the original document.

In a conventional digital color copying machine, there is provided a color control device for adjusting the color of an image to be formed by a copying operation and it is possible that an operator of the copying machine operates said color control device so as to vary and adjust the color of the image to a color as similar as possible to that of the original document or to a color the operator likes.

In the conventional digital color copying machine, however, it can not be seen what color adjustment has been done without seeing the image formed by every actual copying operation of the color control device. Therefore, many times of copying and printing tests must be done for adjusting the color, so that a lot of sheets and expensive color toner are wasted and that a lot of time and labor are needed, resulting in a high price of the running cost.

Moreover, in the conventional digital color copying machine, there is provided an image memory unit for once storing an image in order to compose an image and when a character is copied to be printed or an image is formed in a work station, the image is stored in the image memory unit as a data with two values without gradation and since the image is composed on the basis of the two-value data without gradation stored in the image memory, it is impossible to correct the color of the image data read out of the image memory unit so that it is difficult to correct the color of the image when the image is composed.

Moreover, there is another problem that, since it is impossible to set different copying magnification/minification rates to the respective images to be composed, the image editing work is troublesome.

SUMMARY OF THE INVENTION

The present invention has been made considering the problems mentioned above and a first object of the present invention is to provide a digital color copying machine which is capable of adjusting the color of the image to be formed without wasting sheet and toner for development and in which the image memory means for controlling the color is also used for forming the image so that the image memory means is effectively used so that the color control can be performed also in composing the image.

Another object of the present invention is to provide a digital copying machine in which a registered image stored in an image memory means can be composed on a predetermined area of the original document image at any magnification/minification rate and in which at the same time a color compensation of the registered image can be performed.

In order to solve the problem mentioned above and to accomplish the objects, a digital color copying machine according to the present invention is characterized in that, said copying machine comprises means for setting a specific area in an image of an original document, image memory means for storing image data in said specific area as an image data with gradation, color compensating means for compensating the color of the image data read out of said image memory means, forming means for forming a plurality of images each having color differently compensated respectively in different positions on one copying sheet. Moreover, the present copying machine comprises prohibition means for prohibiting an image forming in a predetermined area in the entire image of the original document, means for forming an image in the area where an image forming is prohibited by said prohibition means on the basis of the image data read out of said image memory means, and magnification/minification setting means capable of setting at different rates respectively on the original document image and the image based on the image data signal read out of the image memory means.

As described above, according to the present invention, an area where the color control is especially desired to be performed in the entire image of the original document (attention area) and an area where an image is desired to be composed are set by the setting means for setting a specific area and the data of the images in the areas mentioned above are stored in the image memory means.

Various color revisions are performed on the image data read out of the image memory means and the images subjected to individual color compensation are formed in different positions on the same sheet in one printing process.

The operator of the copying machine can select a copied image having a color most nearly to the color of the original image or a copied image having a color the operator likes, whereby the color control can be easily performed.

Moreover, there is formed an image with a white space in a predetermined area by the means for prohibiting an image forming in a predetermined area in the original image and there is formed an image read out of the image memory means in the corresponding white space portion, thereby performing an image composition.

In addition, the image forming operations of the original document image and of the image data read out of the image memory means can be independently performed at different magnification/minification rates respectively so that both of the images magnified/minified at different rates can be composed together.

When the image is composed, it is easy to perform the color revision of the image data read out of the image memory means, so that it is possible to form a composed image subjected to a color adjustment.

Moreover, the color compensations for the image data of the original document image and for the image data read out of said image memory means are independently performed by the color compensating means.

The image forming of the original document image and the image forming with the image data read out of the image memory means are performed in one printing process or respectively in different printing processes.

BRIEF DESCRIPTION OF THE DRAWINGS

The attached drawings show an embodiment according to the present invention.

DETAILED DESCRIPTION OF THE PREFERRED EMBODIMENT

A preferred embodiment of a color copying machine according to the present invention is described hereinafter with reference to the attached drawings.

In the color copying machine of the present invention, image data of an original document are read by an image sensor and are converted into digital form image data signals so that an image of the original document is formed to be printed on a copying sheet by an electrophotographic method on the basis of the converted image data signals of digital form.

Figure 1:
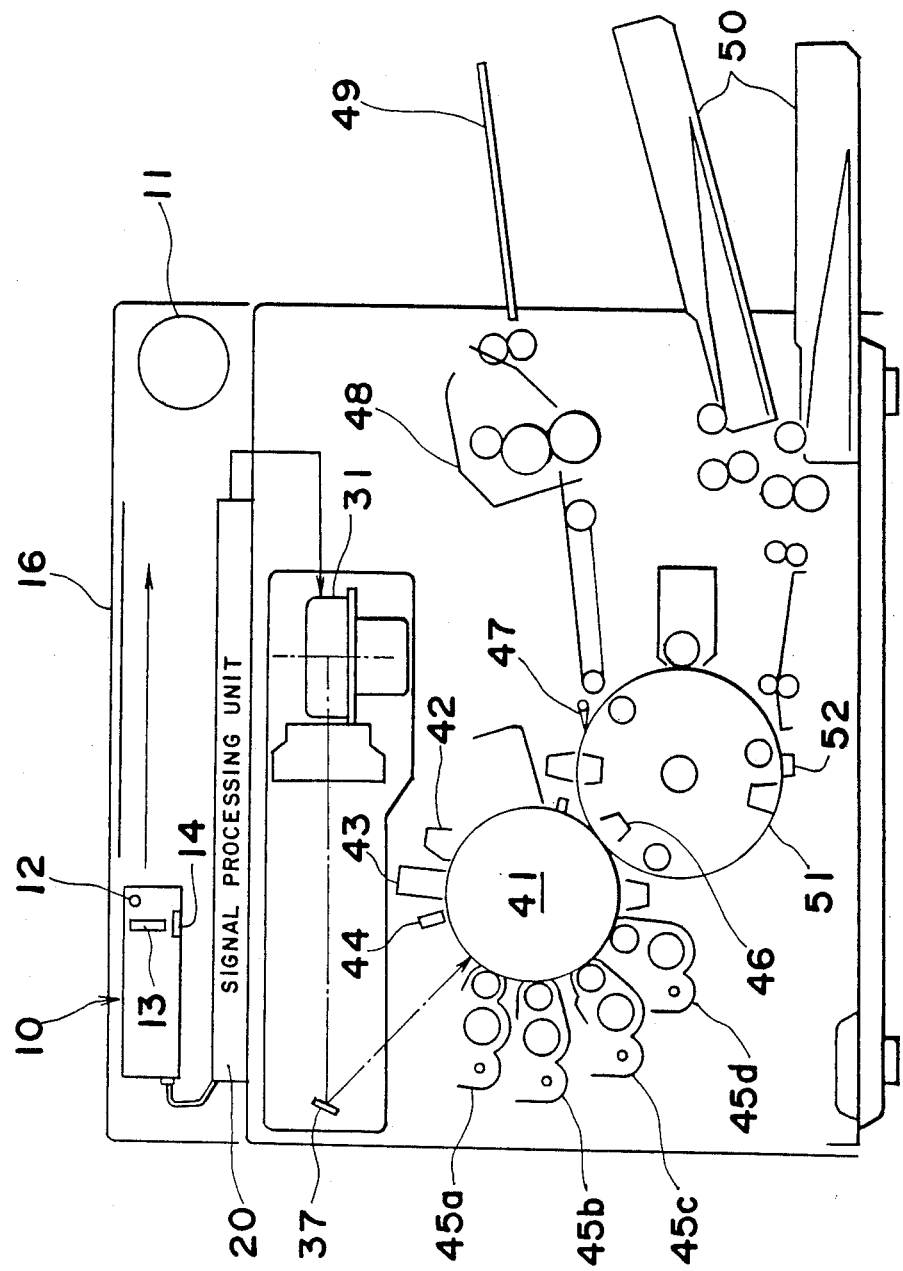
FIG. 1 is a front view showing an entire part of a constitution of a copying machine.

In FIG. 1, in a scanner 10, there are provided an exposure lamp 12 for exposing light onto the original document, a rod lens array 13 for projecting the reflection lights reflected by the original document and an image sensor 14 for color copying operation composed of such as contacting type charge coupled device (referred to as CCD hereinafter) for converting the projected lights into electric signals.

The scanner 10 is driven by a motor 11 when the image of the original document is scanned to be read, so that the scanner 10 scans the original document placed on a platen 16 for placing the original document.

The image data of the original document radiated by the exposure lamp 12 are photoelectrically converted by the image sensor 14 and the photoelectrically converted signals of the image are transformed into printing signals for printing in any one of colors, i.e., yellow, magenta or cyan through a signal processing unit 20.

Figure 3:
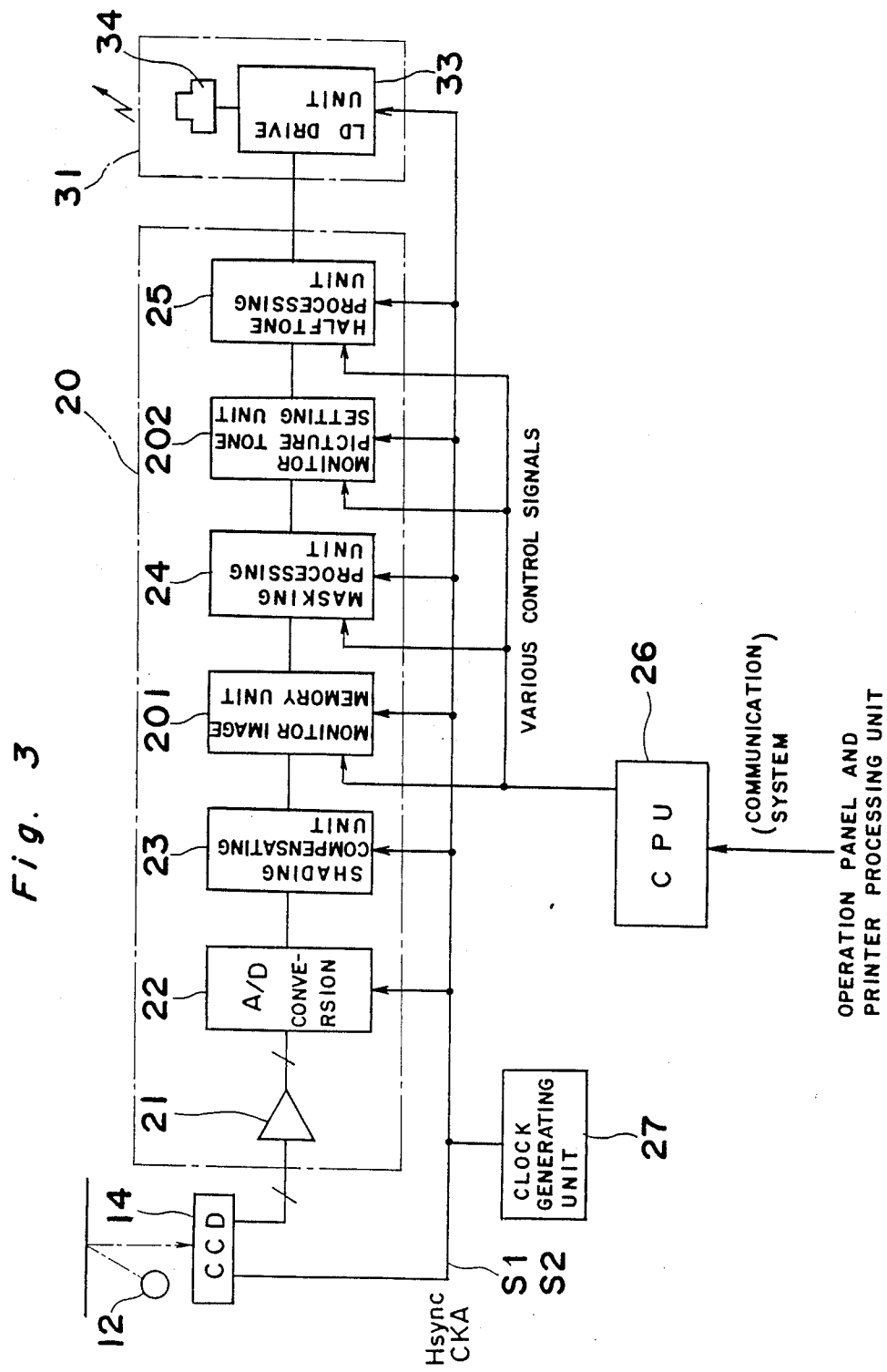
FIG. 3 is a block diagram showing a constitution of a signal processing unit.

In a printer head portion 31, a LD drive unit 33 is driven in response to the respective printing signals for printing in every color of yellow, magenta and cyan transmitted from the signal processing unit 20 and a semiconductor laser generator 34 is turned on and off (see FIG. 3).

The laser beam radiated by the semiconductor laser generator 34 is reflected by a reflection mirror 37 and exposes a surface of a photosensitive drum 41.

The surface of the photosensitive drum 41 is uniformly charged with electricity by an electrification charger 43 and when the surface of the photosensitive drum 41 is exposed with the laser beam, there is formed an electrostatic latent image on the surface of the drum 41.

The electrostatic latent image is developed with any of the developers of yellow, magenta or cyan contained in developing units 45a to 45c respectively.

The developed image mentioned above is transferred to a surface of a sheet wound onto a surrounding surface of a transfer drum 51 by a transfer charger 46.

After the process mentioned above is repeated with respect to the three toner colors of yellow, magenta and cyan of the developers, the sheet on the surface of the transfer drum 51 is removed from the transfer drum 51 by means of a separating tip 47. Then the removed sheet is transported to a fixing device 48 and the transferred image on the sheet is fixed through the fixing device 48 and the sheet with the image fixed is exhausted to a sheet exhauster tray 49. In the process mentioned above, the scanner 10 repeats the scanning operations synchronized with the rotations of the photosensitive drum 41 and the transfer drum 51.

Moreover, in the color copying operation, the scanner 10 repeats the scanning operations three times which is the number of the toner colors.

That is, with the first scanning operation of the scanner 10, the yellow image developed with yellow developer is formed on the surface of the photosensitive drum 41 and transferred to the surface of the copying sheet wound on the surface of the transfer drum 51.

Subsequently, with the second scanning operation of the scanner 10, the magenta image developed with magenta developer is formed on the surface of the photosensitive drum 41 and transferred onto the yellow image transferred on the surface of the copying sheet on the surface of the transfer drum 51.

Subsequently, with the third scanning operation, the cyan image developed with cyan developer is formed on the surface of the photosensitive drum 41 and transferred onto the yellow and magenta images transferred on the surface of the copying sheet on the surface of the transfer drum 51.

As described above, with three times of the scanning operations, the images of yellow, magenta and cyan are composed on the same one copying sheet so that the color image of the original document is formed.

Moreover, the copying sheets are fed from a sheet feeding cassette 50 and the tip edge of the sheet is fastened by means of a fastener mechanism 52 in order that the copying sheet is not displaced at the time of the transfer operation in every color of the developers.

There is further provided an eraser lamp 42 for erasing the remaining electric charge on the surface of the photosensitive drum 41 so as to prepare for forming the next image.

Figure 2:
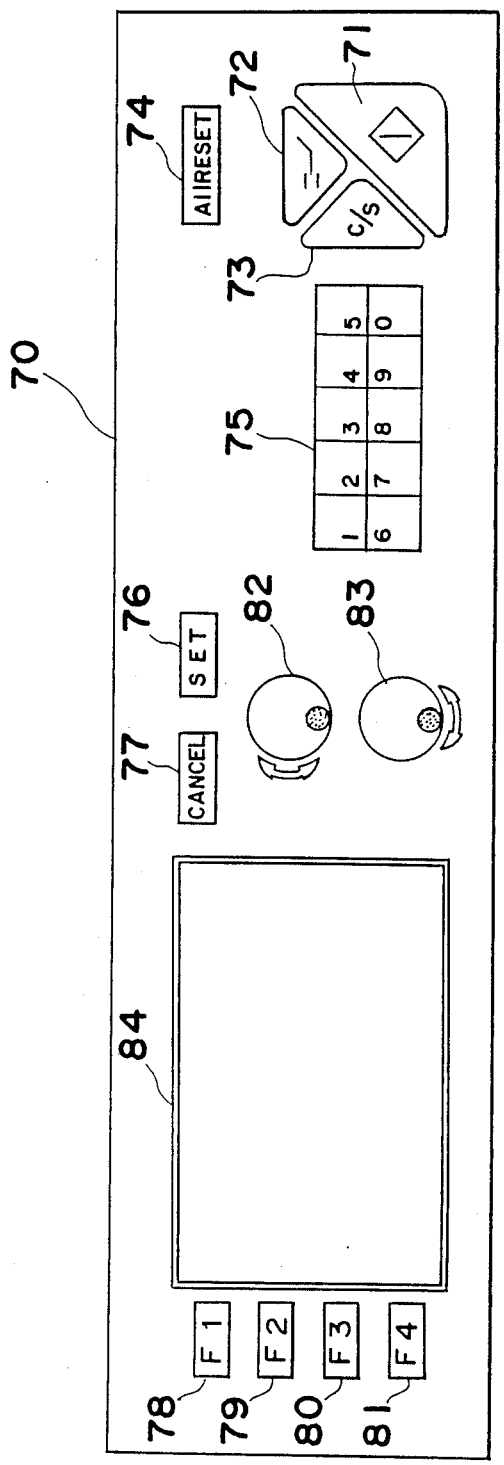
FIG. 2 is plan view showing an operation panel having various keys arranged.

FIG. 2 shows an arrangement of various kinds of keys provided in an operation panel 70 disposed on the upper surface of the copying machine.

In the operation panel 70, there are provided a print starting key 71 for starting the copying operation, an interruption key 72 for indicating an interruption of a copying operation, a clear stop key 73, an all reset key 74, ten numeral keys 75, a set key 76, a cancel key 77, function keys 78 to 81, jog dials 82 and 83 for setting an attention area and a specific area for composing images, and a display unit 84 made of such as liquid crystal for displaying an image of the original document and various kinds of messages in order to set the attention area or the specific area.

As shown in FIG. 3, there are provided a monitor image memory unit 201 and a monitor picture tone setting unit 202, which are specific portions of the present invention and are not operated when a normal copying operation is performed, that is to be described later.

The image data signals of the three primary colors R (red), G (green) and B (blue) which are photoelectrically converted through the image sensor 14 are respectively operationally amplified to signals each having an amplitude corresponding to the image density by a logical operational amplifier 21 and, subsequently, the amplified image signals are converted from analogue form to digital form by an analogue-to-digital (referred to as A/D hereinafter) converter 22. The digital form image data signals have gradation and then the shading compensation thereof is performed by a shading compensation unit 23.

Subsequently, the image signals for printing corresponding to each of the printing colors Y (yellow), M (magenta), C (cyan) and BL (black) are generated from each of the image signals of the three colors R, G and B through a masking processing unit 24 according to the qualities of the toner contained in the developing units 45a to 45d.

Generally, the transformation equation for transforming the original image signals R, G and B into the printing signals Y, M and C is represented as follows.

$$\begin{vmatrix} Y \\ M \\ C \end{vmatrix} = \begin{vmatrix} a_{00} & a_{01} & a_{02} \\ a_{10} & a_{11} & a_{12} \\ a_{20} & a_{21} & a_{22} \end{vmatrix} \begin{vmatrix} B \\ G \\ R \end{vmatrix} \quad (1)$$

Herein, the transformation factors $a_{00}$ to $a_{22}$ are appropriately predetermined by logic and experience in order to print an image having colors as nearly as possible to the color of the image of the original document.

Moreover, it is successively determined in response to the control signals transmitted from a central processing unit (referred to as CPU hereinafter) 26 in which color the printing signal for printing should be generated.

A halftone processing unit 25 processes the printing signal sent from the masking processing unit 24 into two-valued signal by e.g. a dither technique so as to generate a pseudo-halftone signal between the two values.

A clock generator 27 generates a horizontal synchronizing signal (Hsync) S1 and a dot clock signal (CKA) S2 and both of the signals S1 and 2 are fed to each of the units provided in the signal processing unit 20.

Figure 6:
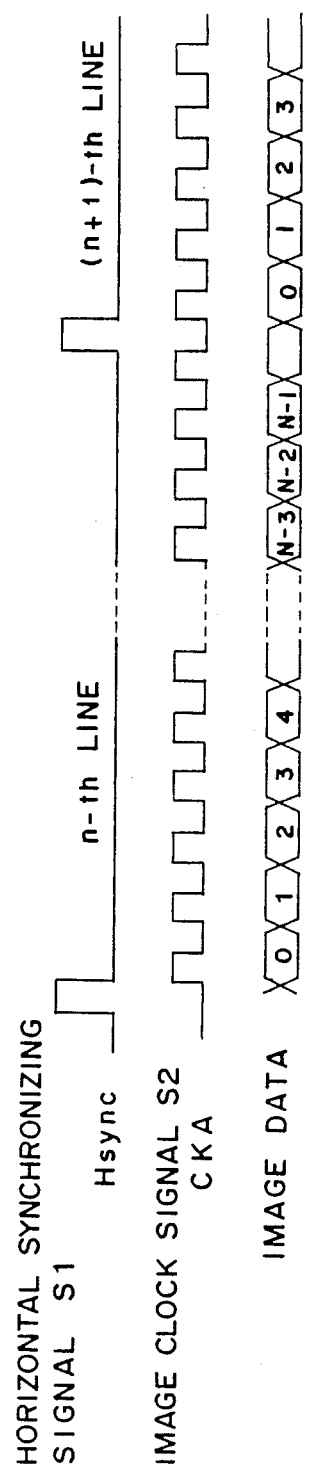
FIG. 6 is a timing chart showing a flow condition of the image data.

As shown in FIG. 6, in the signal processing unit 20, the image data signal transmitted from the image sensor 14 is synchronized with the dot clock signal CKA and flows serially to be processed. The line in the main scanning direction is renewed every time the horizontal synchronizing signal Hsync is generated, in other words, the scanning is advanced by a unit length in the sub-scanning direction.

As described above, although a suitable printing signal is generated by the masking processing unit 24, it is difficult to suppress the difference between the color of the original document image and the color of the printing image up to a very small degree with regard to all of the colors. However, within some limited range of the chromaticity, it is possible to suppress the difference between the colors mentioned above to be very small by controlling the tone of the colors.

MOSAIC MONITOR MODE

In a mosaic monitor mode of the present embodiment, on the basis of the fact mentioned above, the attention area of which the color is especially desired to be reproduced by an operator is stored in the image RAM (random access memory) and the attention area is read out a plurality of times while the color of the read out image is differently compensated little by little and the images with compensated color are reproduced in different positions on the same sheet in one time printing process After the operator selects an image with the most desirable color among them, the entire part of the original document image is copied on the basis of the compensation coefficients used in the compensation of the most desirable color control mentioned above. Herein, one printing process means one time copying operation in the case of forming a single color image and it means a plurality of copying operations of the corresponding times which are equal to the number of the primary colors used in the color image copying operation.

Next, the color correction selecting control (referred to as mosaic monitor hereinafter) is explained.

The mosaic monitor is realized by the operation of the monitor image memory unit 201 for storing the attention area and of the monitor picture tone setting unit 202 for controlling the color in the printing process.

The way of setting the attention area is explained with reference to FIGS. 4 and 11.

Figure 11:
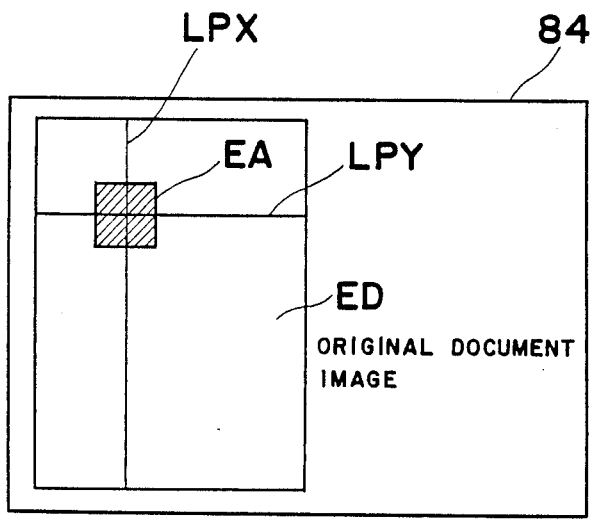
FIG. 11 is an enlarged plan view of the display unit.

The original document is placed on the platen 16 and is scanned for preparation by the scanner 10, whereby the image of the original document is schematically displayed in the original document area ED on the display unit 84 provided in the operation panel 70 and there are displayed indication lines LPY in the main scanning direction (X axis direction) and LPX in the sub-scanning direction (Y axis direction) (see FIG. 11). The intersection point of the indication lines LPY and LPX is the center of the attention area EA. The indication lines LPY and LPX are moved upper and lower or left and right with an operation of the jog dials 82 and 83, whereby the attention area EA is defined to be set by operating the set key 76.

As shown in FIG. 11, the size of the attention area EA is generally two centimeters square and the coordinates of the four top points thereof are inputted in the monitor image memory unit 201 and are transmitted to the CPU 26 through a communication line when necessary. The size of the attention area EA is equal to the memory capacity of an image RAM 403 provided in the monitor image memory unit 201.

The range of the scanning lines seeing from the edge of the image and the range of the image elements in the main scanning direction where the attention area EA is situated can be easily calculated. The CPU 26 sets the attention area EA as the writing area setting signals to a writing area judging unit 406.

The writing area judging unit 406 is composed of a judging unit 406a for judging the area in the main scanning direction (X direction) and a judging unit 406b for judging the area in the sub-scanning direction (Y direction).

During the input period of the image top signal S5, judging units 406a and 406b counts the dot clock signal CKA and the horizontal synchronizing signal Hsync, in other words, the judging unit 406a counts the dot clock signal CKA and generates the signal S3, on the other hand, the judging unit 406b counts the horizontal synchronizing signal Hsync and generates the signal S4 and it is judged whether or not the counted values are within the range of the setting area.

In case the count values are within the range of the setting area in the main scanning direction or in the sub-scanning direction respectively, the signal S3 (low active WEX signal) or the signal S4 (low active WEY signal) becomes L (low level) respectively.

Similarly, a writing address generating counter 405 is composed of a counter 405a for counting the signal in the main scanning direction and a counter 405b for counting the signal in the sub-scanning direction. When the signal S3 sent from the judging unit 406a is Low level, the counter 405a counts the dot clock signal CKA and generates an address signal with respect to the main scanning direction. When the signal S4 sent from the judging unit 406b is Low level, the other counter 405b counts the horizontal synchronizing signal Hsync and generates an address signal with respect to the sub-scanning direction.

The address with respect to the main scanning direction (i.e., the content of the counter 405a) is cleared by the horizontal synchronizing signal Hsync and the address with respect to the sub-scanning direction (content of the counter 405b) is cleared by the image top edge signal S5 generated by the CPU 26.

Both of the address signals generated by the writing address generating counters 405a and 405b are sent to an address terminal of the image RAM 403 via a selector 404.

The above mentioned signals S3 and S4, a signal S6 obtained by inverting the dot clock signal CKA S2 through an inverter 410 and a data keeping signal S7 are entered to a gate 409 and when these signals are within the range of the writing area and the data keeping signal S7 is active Low level, the signal S6 is generated from the output terminal of the gate 409.

When a signal S8 for switching write-in/read-out is Low level, the output signal of a gate 411 becomes Low level and the output signal of an inverter 412 becomes High level, whereby the selector 404 selects the output signals of the writing address generating counter 405 so that the mode of the image RAM 403 becomes a writing mode. Moreover, an output signal S13 of the inverter 412 is also sent to a selection signal generating unit 425 provided in the monitor picture tone setting unit 202 to be described later.

The image data with gradation is transmitted from the shading compensation unit 23 to the input/output terminal I/0 of the image RAM 403 through a selector 401 and an image selecting unit 402. The image data signal mentioned above is synchronized with the dot clock signal CKA and sequentially written in the address indicated as described above.

Thus, the image data of the attention area EA is written in the image RAM 403. When the writing of the image data of the attention area EA is completed, the CPU 26 changes the data keeping signal S7 into High, preserving the content of the image data written in the image RAM 403.

Next, the operation of reading out the data from the image RAM 403 is explained.

Figure 12:
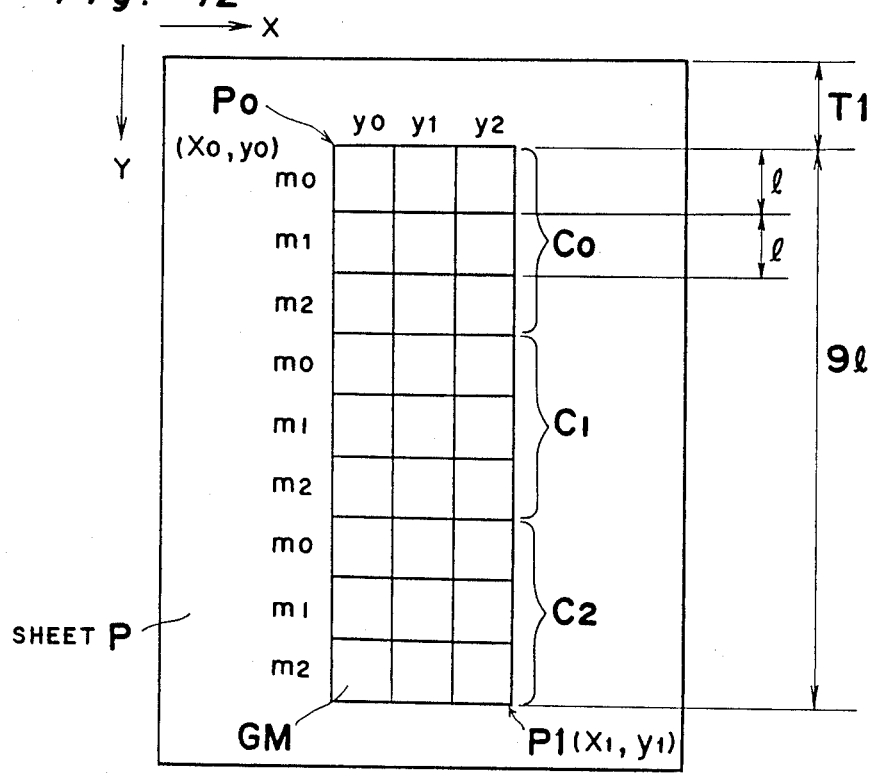
FIG. 12 is a schematic diagram showing an example of a sheet with a mosaic monitor image formed.

As shown in FIG. 12, the image of the attention area EA is divided into 27 mosaic monitor images GM each having various color compensation with three mosaics in the main scanning direction (X direction) and nine mosaics in the sub-scanning direction (Y direction) so as to be printed on one copying sheet P. The mosaic monitor images GM are printed on the area of the sheet P between the coordinates $x_0$ and $x_1$ in the main scanning direction and between the coordinates $y_0$ and $y_1$ in the sub-scanning direction.

In this case, the way of reading out the image data from the image RAM 403 is in that, as to the image data stored in the image RAM 403, the content on the same line in the main scanning direction is read out every three times and when the entire contents are read out over in the subscanning direction, the image data is similarly read out from the top line again, repeating the reading-out operation nine times.

When the image data stored in the image RAM 403 is read out, the signal S8 transmitted from the CPU 26 becomes High, so that the selector 404 selects the output signals of the reading address generating counter 407 and the output signal of the inverter 412 becomes Low and the mode of the image RAM 403 becomes a reading mode.

The reading area judging unit 408 for judging the reading area for the copying sheet P is composed of a judging unit 408a for judging the area in the main scanning direction (X direction) and a judging unit 408b for judging the area in the sub-scanning direction (Y direction) in a manner similar to the writing area judging unit 406 as mentioned above.

In the judging units 408a and 408b, there are previously stored two pairs of coordinates $x_0$, $x_1$ and $y_0$, $y_1$ respectively by entering the reading area setting signals, wherein assuming that the count values of the judging units 408a and 408b are X and Y respectively, when the condition of $$x_0 \leq X \leq x_1$$

$$y_0 \leq Y \leq y_1$$

is satisfied, it is judged that the count values X and Y are within the range of the area.

When both of the output signals S9 (low active REX signal) and S10 (low active REY signal) of the judging units 408a and 408b respectively are enable signals, the reading address generating counter 407 generates address signals and the contents of the image RAM 403 are read out, in other words, the image data stored in the RAM 403 are read out to be sent to the masking processing unit 24.

At this time, the reading address generating counter 407 is required for counting the generated signals even though the count value exceeds the maximum thereof and at this time the address generating counters 407a and 407b generate overflow signals S11 and S12 respectively and start the counting operation from the initialized count value.

The overflow signals S11 and S12 are transmitted to the monitor picture tone setting unit 202 and used for changing the coefficients of the color compensation.

When the contents of the image RAM 403 are read out, the output signal of the image selecting unit 402 is in a high impedance state and when the contents of the image RAM 403 are not read out, the selector 401 selects "white" data since the "white" image data are generated in the rear step.

Figure 5:
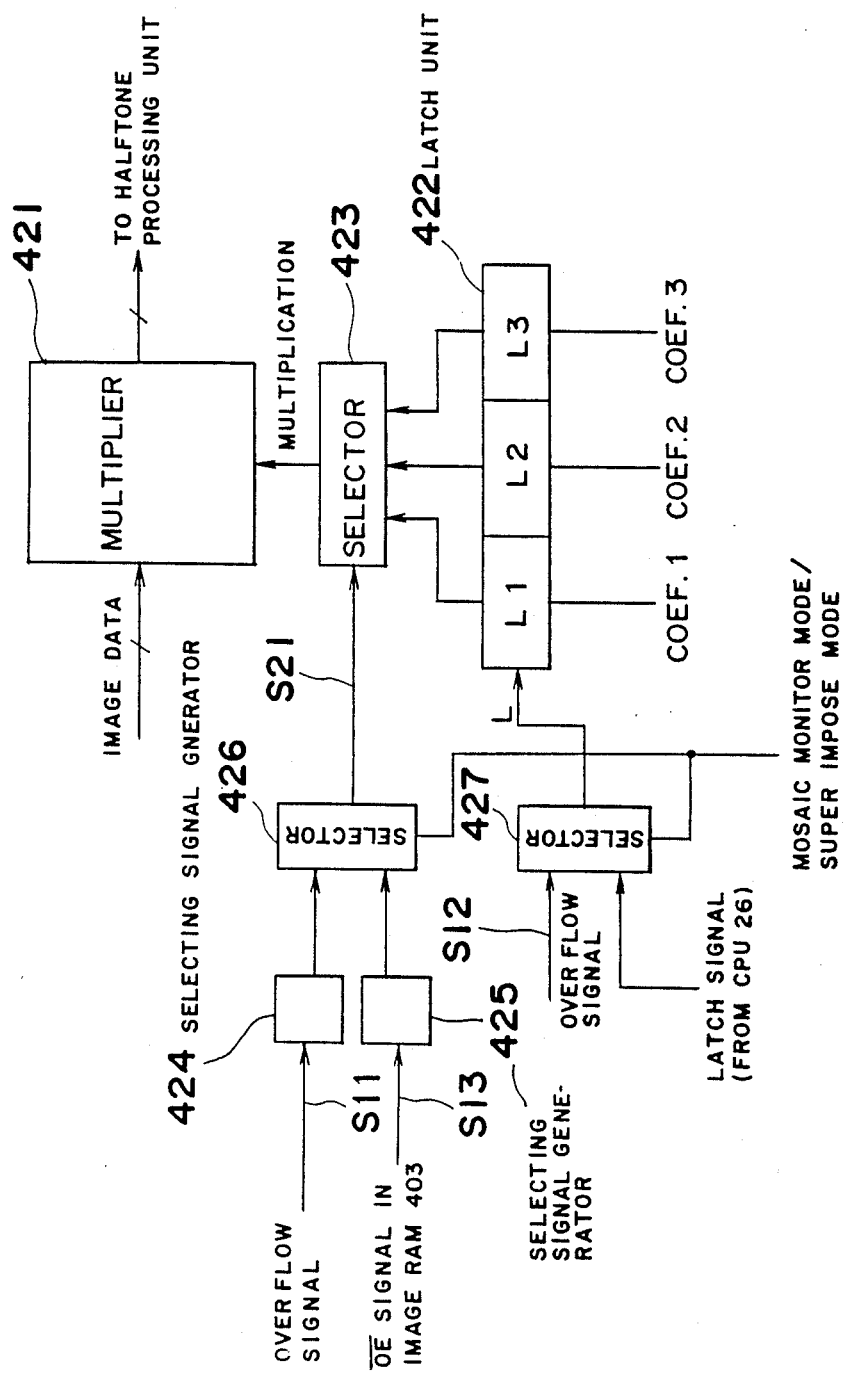
FIG. 5 is a circuit diagram of a monitor picture tone setting circuit.

As shown in FIG. 5, the monitor picture tone setting unit 202 is a circuit arrangement for controlling the colors of the mosaic monitor images.

The color correction mentioned above is performed by obtaining the corrected printing signals $Y_1$, $M_1$ and $C_1$ through the calculation as follows.

$$Y_1 = k_1 Y$$
$$M_1 = k_2 M$$
$$C_1 = k_3 C$$

wherein $k_1$, $k_2$ and $k_3$ are coefficients for the color correction and Y, M and C are the printing signals obtained by the calculation of the equation (1) mentioned above.

In the mosaic monitor images GM shown in FIG. 12, the coefficient $k_1$ of Y (yellow) is not varied in the sub-scanning direction but varied to be $y_0$, $y_1$ and $y_2$ in the main scanning direction. The coefficient $k_2$ of M (magenta) is not varied in the main scanning direction but sequentially varied to be $m_0$, $m_1$, $m_2$, $m_0$, $m_1$... every one block in the sub-scanning direction. The coefficient $k_3$ of C (cyan) is not varied in the main scanning direction but varied to be $c_0$, $c_1$, and $c_2$ every three blocks in the subscanning direction.

Therefore, in the monitor picture color tone setting unit 202, the coefficients $k_1$, $k_2$ and $k_3$ for the printing signals Y, M and C are made variable as mentioned above.

A multiplier 421 executes the calculation for obtaining the above mentioned printing signals $Y_1$, $M_1$ and $C_1$. Herein, there is provided a latch circuit arrangement 422 composed of three latches L1, L2 and L3 for setting three different kinds of coefficients in the main scanning direction and the coefficients generated by the CPu 26 are set in the latch arrangement 422. The setting process thereof is explained in a flow chart to be mentioned later.

The reason why the latch arrangement 422 composed of three latches is provided in the monitor picture color tone setting unit 202 is that, the varying periods of the coefficients in the main scanning direction are too short in a view of speed for the CPU 26 to set the coefficients in a real time. In case of n kinds of the coefficients, there may be provided n pieces of latches in parallel.

The overflow signal S11 in the main scanning direction generated at the time of reading out the image data stored in the image RAM 403 provided in the monitor image memory unit 201 mentioned above is inputted to a selection signal generating unit 424 so as to be entered in a selector 423 as a signal S21 through a selector 426 which transfers the output signal of the selection signal generating unit 424 to the selector 423 at the time of the mosaic monitor mode.

Every time the overflow signal S11 is entered in the selection signal generating unit 424, the selection signal generating unit 424 generates such signals that the selector 423 sequentially switches the respective latches L1, L2 and L3 selectively.

Thus, the respective coefficients latched in the latch arrangement 422 are sequentially sent to the multiplier 421 selectively. As the input data signals set in the respective latches L1, L2 and L3, there are applied coefficients for the monitor image of the subsequent block with respect to the main scanning direction.

The overflow signal S12 in the sub-scanning direction generated when the contents of the image RAM 403 are read out in the monitor image memory unit 201 is inputted to a selector 427 and when the mosaic monitor mode is set, the selector 427 transfers the input overflow signal S12 to the latch arrangement 422. By this way, every time the overflow signal S12 is generated, the latch arrangement 422 latches the input data (i.e., coefficients) thereof and renews them, generating and sending the renewed data signals to the multiplier 421 through the selector 423.

Therefore, if the block in the sub-scanning direction is changed, the pair of the coefficients are immediately changed.

Figure 7A:
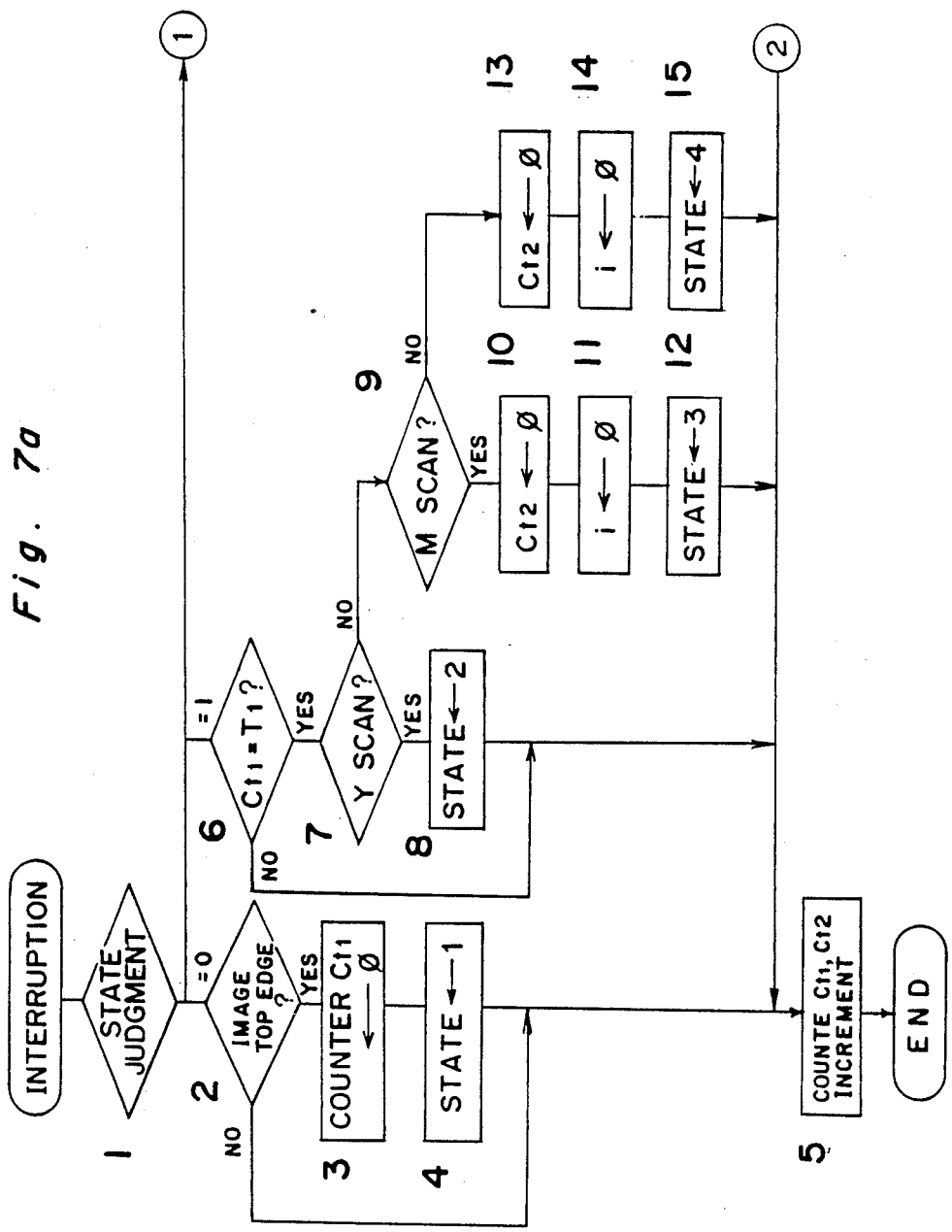
FIGS. 7a and 7b are flow charts showing a process for setting factors for controlling the colors.
Figure 7B:
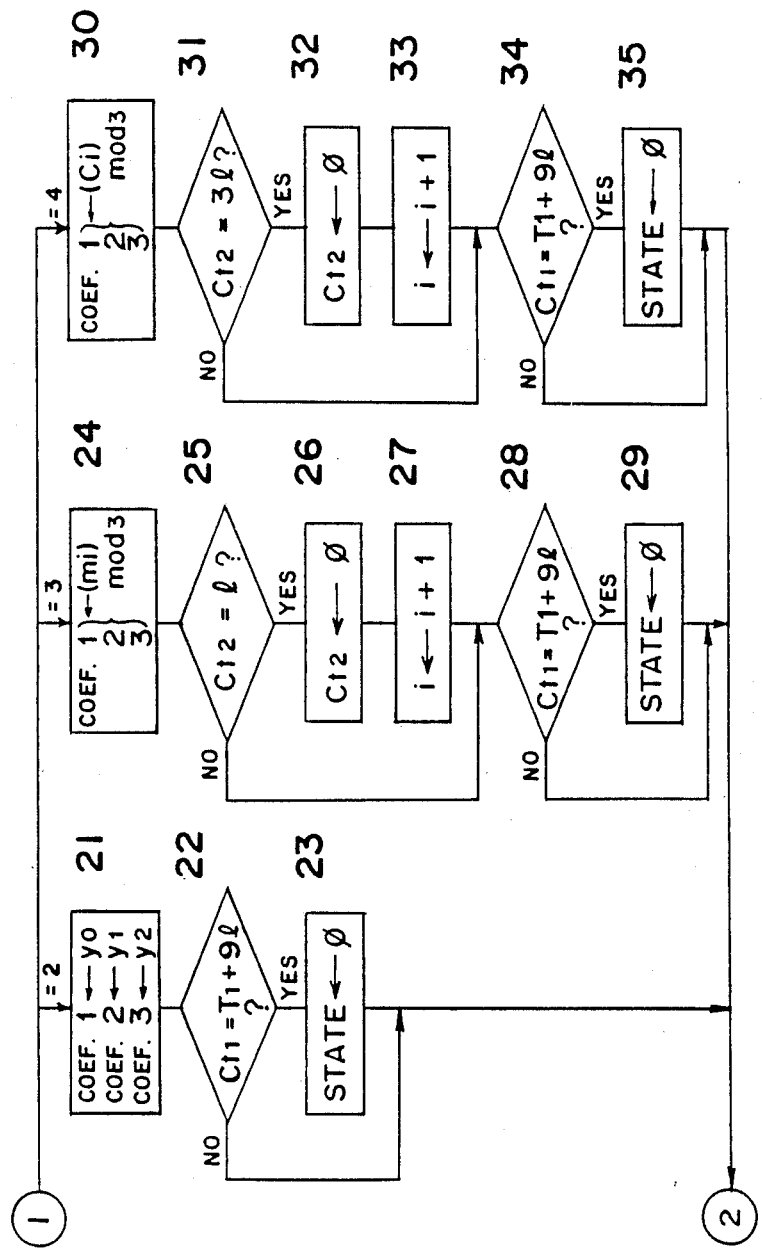

FIG. 7 is a flow chart for explaining the process of setting the coefficients for the color correction. Whenever the horizontal synchronizing signal Hsync is generated, an interruption signal is applied to the CPU 26, whereby the above mentioned process for setting the color correction coefficients is executed as the interruption routine.

In FIG. 7, a counter $Ct_1$ counts the distance from the top edge of the image to the sub-scanning direction and detects the beginning and the end of the printing of the mosaic monitor images GM. A counter $Ct_2$ counts the distance in the sub-scanning direction and detects the change of the block of the mosaic monitor image Reference character T1 denotes the distance from the image top edge to the printing position of the mosaic monitor image and denotes a dot number (number of lines) in one block in the sub-scanning direction (see FIG. 12).

In step #1 the state is judged and is branched into a predetermined steps according to the judged values "0" to "4".

When the state is "0", it is judged in step #2 whether or not the counted position is the image top edge (top end portion of the copying sheet P), and in case the top edge of the image is passed, the counter $Ct_1$ is initialized in step #3 and the state is set "1" in step #4.

When the state is "1", the program waits till the count value of the counter $Ct_1$ becomes T1, in other words, the program waits till the count value of the counter $Ct_1$ reaches the position of the coordinate $y_0$ of the top edge of the mosaic monitor image GM in step #6. Subsequently, the program jumps to any one of the states "2", "3" and "4" according to the color of the toner contained in the developing unit in use.

In other words, when it is judged in step #7 the color of the toner of the developing unit in use is yellow Y, the state becomes "2" in step #8. When it is judged in step #9 the color of the toner of the developing unit is magenta M, the counter $Ct_2$ is initialized in step #10 and the variable i is set "0" in step #11 and the state is set "3" in step #12. When the color of the toner of the developing unit is cyan C (judged "No" in step #9), the counter $Ct_2$ is initialized in step #13 and the variable i is set "0" in step #14 and the state is set "4" in step #15.

When the process of each of the states is completed, the count values of the counters $Ct_1$ and $Ct_2$ are increased in step #5.

When the state is "2", the values $y_0$, $y_1$ and $y_2$ are assigned for the coefficients 1, 2 and 3 which are set in the latches L1, L2 and L3 respectively in step #21 and the program waits till the count value of the counter $Ct_1$ becomes ($T1+9$ 1), in other words, the program waits till the count value of the counter $Ct_1$ reaches the position of the coordinate $y_1$ which is the rear edge of the mosaic monitor images GM in step #22 and the state is set "0" in step #23.

When the state is "3", a value mi is assigned for the coefficients 1 to 3 in step #24 and the program waits till the count value of the counter $Ct_2$ becomes 1, in other words, the program waits till the mosaic monitor of one block is finished in step #25 and the counter $Ct_2$ is initialized in step #26 and the variable i is increased by one in step #27.

Subsequently, the program waits till the mosaic monitor reaches the rear edge of the mosaic monitor image in step #28 and the state is set "0" in step #29.

That is to say, each of the coefficients 1 to 3 is set in the same value mi and every time the mosaic monitor image is changed by one block in the sub-scanning direction, the coefficients 1 to 3 are changed to a new value $m(i+1)$ When the state is "4", a value ci is assigned for the coefficients 1 to 3 in step #30 and the program waits till the count value of the counter $Ct_2$ becomes (3 1), in other words, the program waits till the mosaic monitor of one block is finished in step #31 and the counter $Ct_2$ is initialized in step #32 and the variable i is increased by one in step #33.

Subsequently, the program waits till the mosaic monitor reaches the rear edge of the mosaic monitor image in step #34 and the state is set "0" in step #35.

That is to say, in this case, the coefficients 1 to 3 are set in the same value ci and every time the mosaic monitor images are changed by three blocks in the subscanning direction, the coefficients 1 to 3 are renewed to the value $c(i+1)$.

By the process mentioned above, various coefficients with respect to the respective printing colors are set so as to correct the colors of the images to be formed.

After the mosaic monitor image is formed on the copying sheet P, if the operator selects the image with the most desirable color among them, the coefficients corresponding to the image of the color are automatically set, whereby the copying operation of the entire image of the original document is performed.

Herein, the coefficients for the color correction of the mosaic monitor images are stored in the CPU 26 corresponding to each of the blocks shown in FIG. 12, so that the color correction of the image is performed with the coefficients for the color correction corresponding to the selected blocks.

In order for the operator to indicate the image selected among the mosaic monitor images GM, the operator may operate the function keys 78 to 81 according to the message displayed on the display unit 84 for example.

Otherwise, the image block shown in FIG. 12 may be displayed on the display unit 84 and the coordinates of the block are selected by operating the function keys or the ten keys so as to select the coefficients.

SUPER IMPOSE MODE

Next, a super impose mode for forming an image is explained.

In the super impose mode, the image data previously stored in the image RAM 403 are read out and the registered image is formed to be printed in any position on the copying sheet P.

The image data are registered in the image RAM 403 in the manner, similar to the manner in the mosaic mode as described above, that a specific area (i.e., attention area EA) is defined by operating the jog dials 82 and 83 so that the image data corresponding to the specific area are written in the image RAM 403.

The image of the area except the specific area is printed to be formed on the copying sheet P by a normal copying operation independently of the registration of the original document image in the image RAM 403 while the image forming of the specific area is prohibited.

The printing operations of the original document image (i.e., the image of the area except the specific area) and the registered image (i.e., the image of the specific area) can be performed in one printing process except the case the copying magnification/minification rates of both of the images are different.

At the time of forming the original document image, the prohibition of the image forming of the specific area is executed by switching the image selecting unit 402 in response to the reading operation of the image RAM 403 in the case of forming the both images in one printing process or by switching a selector 415 so as to output the "white" data in the case of forming the original document image and the registered image in different printing processes.

The image of the prohibition portion of the specific area of the original document is formed by printing the registered image read out of the image RAM 403 in the super impose mode, whereby the composed image is formed.

When the image read out of the image RAM 403 is formed, i.e., when the registered image is formed, in the case the image is formed in a process different from the printing process of the original document image, as the image data of the area of the image other than the image read out of the image RAM 403, the "white" data is outputted by switching the selector 401.

In the super impose mode, the selector 401 selects the "white" data and the selector 426 selects the signal generated from the selection signal generating unit 425 and the selector 427 selects the latch signal transmitted from the CPU 26.

Figure 4:
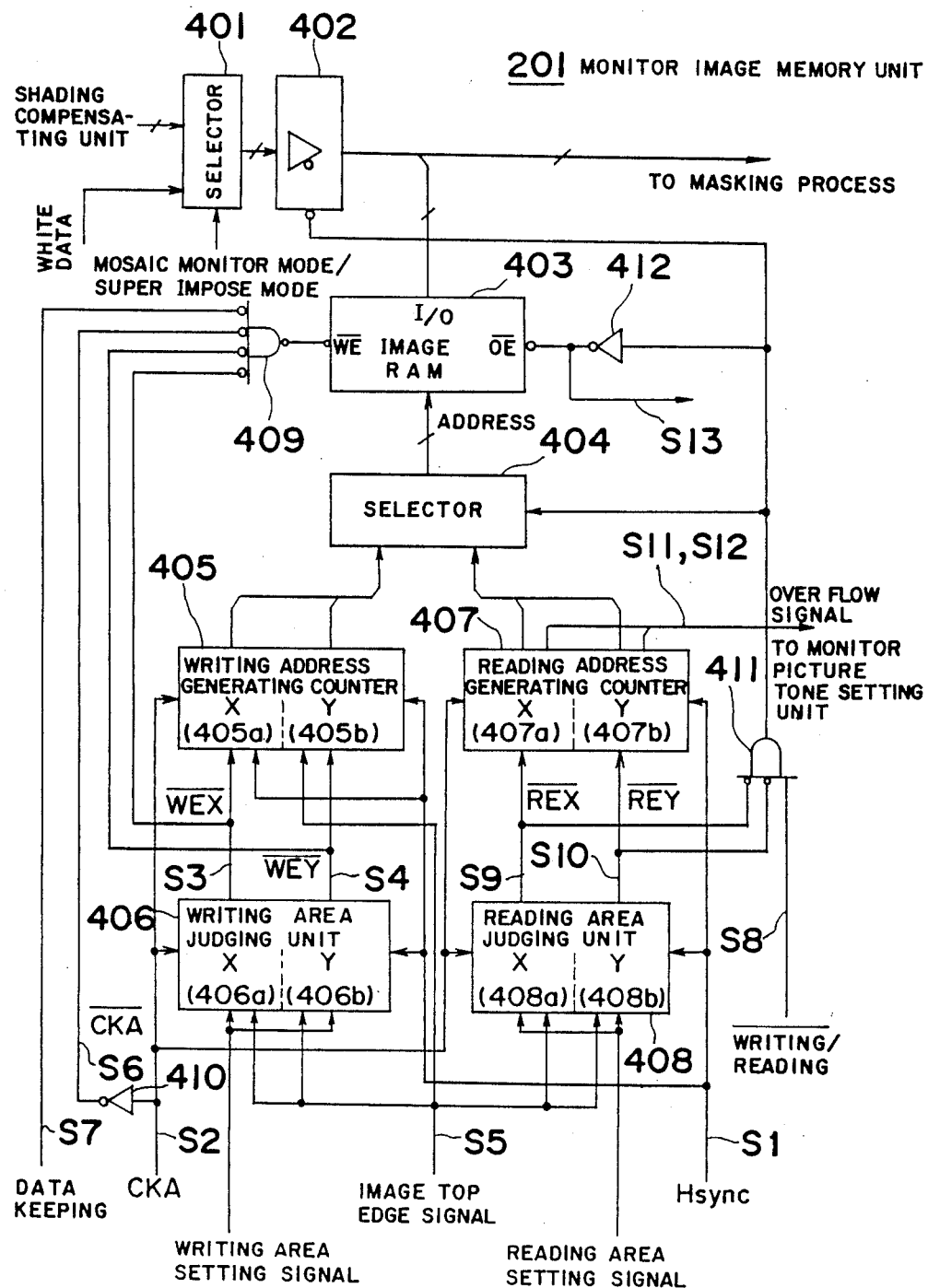
FIG. 4 is a circuit diagram of a monitor image memory circuit.

Next, as shown in FIG. 4, the operation of the monitor image memory unit 201 in the super impose mode is explained.

The registration of the image in the image RAM 403 is performed in the same way as in the mosaic monitor mode.

When the image data is read out of the image RAM 403, the image data corresponding to the position of the image to be written on the copying sheet is set in the reading-out area judging unit 408 by setting the reading-out area setting signal.

In this case, only when both of the output signals S9 and S10 of the reading-out area judging unit 408 are enable Low, the output signal of the gate 411 becomes active and the image data read out of the image RAM 403 may be transferred to the subsequent stage.

When the image data is not read out of the image RAM 403, the selector 401 selects the normal image transmitted from the shading compensation unit 23 and transfers the data to the subsequent stage.

Next, as shown in FIG. 5, the color control operation of the monitor picture tone setting unit 202 in the super impose mode is explained.

The coefficients for the color correction of the original document image and the coefficients for the color correction of the registered image are respectively set to the latches L1 and L2 in the latch arrangement 422.

At this time, the selector 427 receives the latch signal from the CPU 26 and transfers to the latch unit 422, whereby the input data, i.e. the coefficients, of the latch unit 422 are latched by the latch signal.

The selector 426 selects the output signal of the selection signal generating unit 425. The selection signal generating unit 425 generates such signals that, when the output signal of the inverter 412 is High, i.e., when the data signal stored in the image RAM 403 is not read out, the selector 423 selects the latch L1 and when the output signal of the of the inverter 412 is Low, i.e., when the data signal stored in the image RAM 403 is read out, the selector 423 selects the latch L2.

Therefore, in the case that the image of the original document is directly printed to be formed without being stored in the image RAM 403, the color correction is performed by using the coefficients set in the latch L1. In the case that the registration image once stored in the image RAM 403 is read out to be printed, the color correction is performed by using the coefficients set in the latch L2.

Moreover, the coefficients set in the latches L1 and L2 are reset every printing operation with each color. The same operation as mentioned above is also performed in the mosaic monitor mode.

Next, the magnifying/minifying copying operation in the super impose mode is explained.

Figure 8:
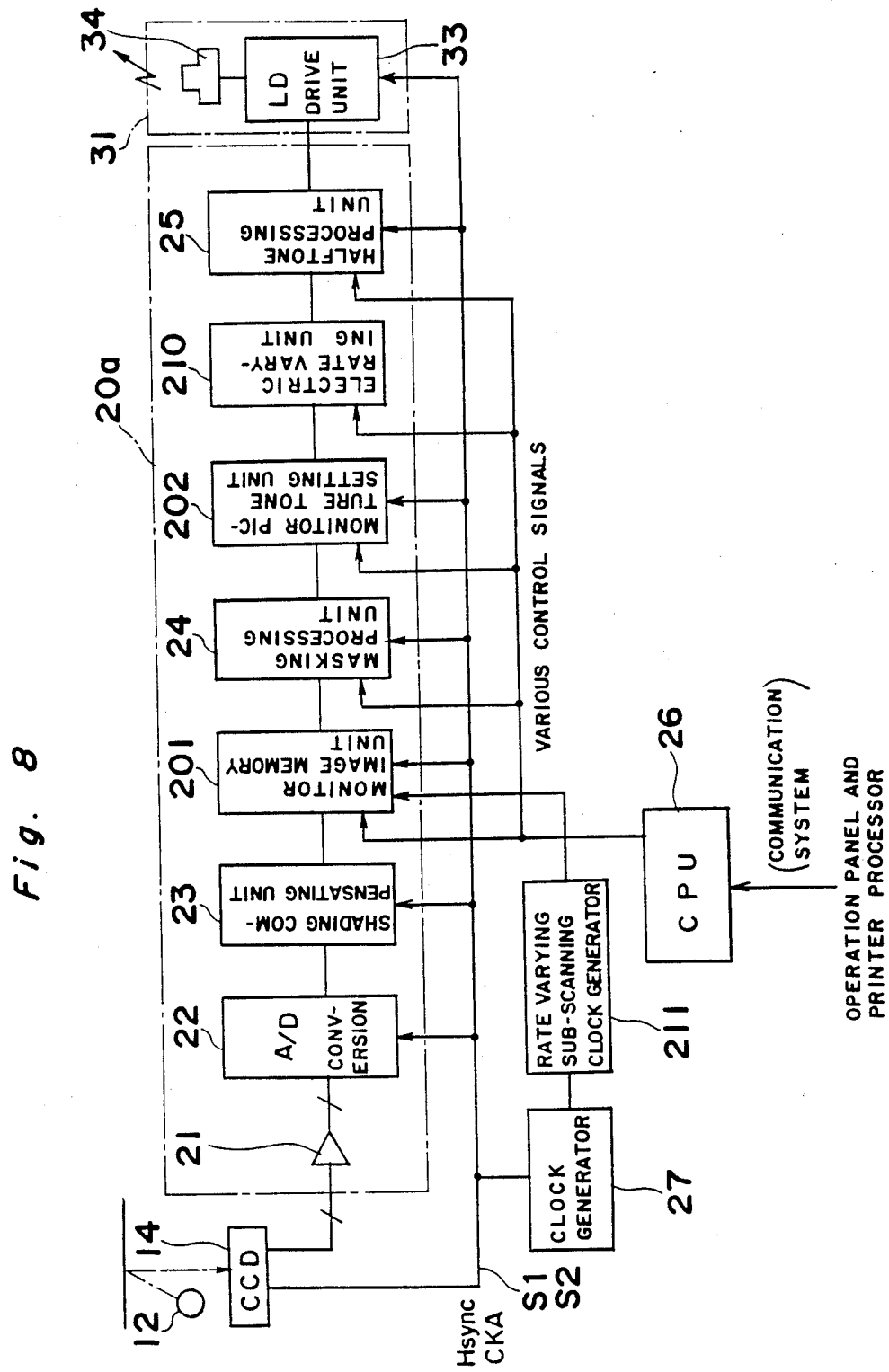
FIG. 8 is a block diagram showing another embodiment of a signal processing unit.

FIG. 8 is a block diagram showing the constitution of a signal processing unit 20a designed for the magnifying/minifying copying operation.

The difference between the signal processing unit 20a and the signal processing unit 20 shown in FIG. 3 is that an electric magnification/minification variable unit 210 and a magnification/minification variable sub-scanning clock generator 211 are added, and since the other portions are the same, the explanation is omitted.

The electric magnification/minification variable unit 210 electrically performs the operation of the magnification/minification of the image in the main scanning direction, and since the method and the circuit arrangement thereof are known in public, the explanation thereof is omitted.

Also, the operation of magnifying/minifying the image in the sub-scanning direction is performed by varying the speed of the relative movement between the original document and the scanner 10, and since the constitution and the method thereof are known, the explanation thereof is omitted.

Figure 9:
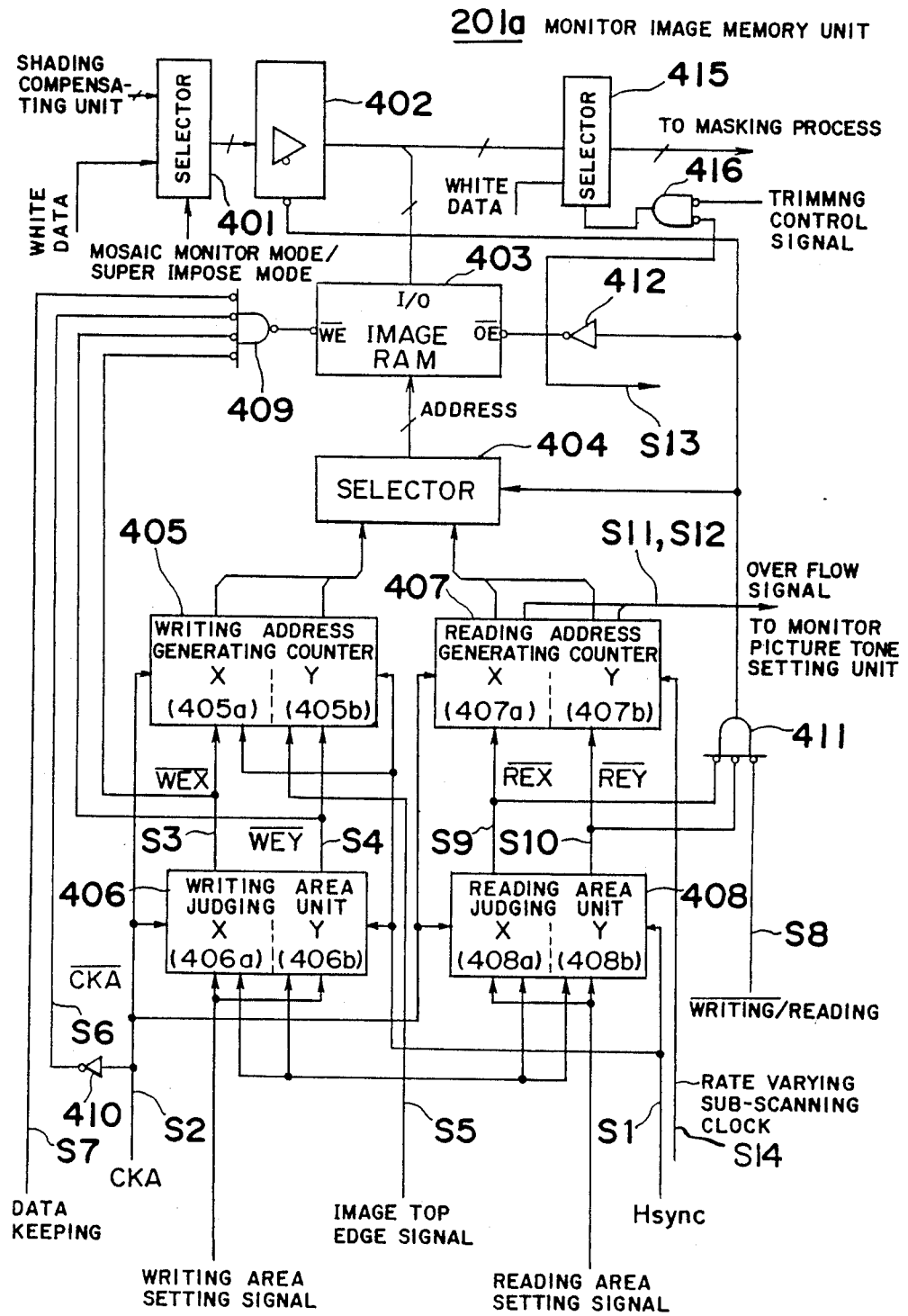
FIG. 9 is a circuit diagram showing another embodiment of a monitor image memory circuit.

FIG. 9 is a circuit diagram showing a monitor image memory unit 201a designed for the magnification/minification variable control.

The difference between the monitor image memory unit 201a and the monitor image memory unit 201 shown in FIG. 4 is that, a selector 415 is provided between the output terminal of the image selecting unit 402 and the masking processing unit 24 and there is provided a gate 416 for switching the selector 415 and that a magnifying/minifying sub-scanning clock signal S14 transmitted from a magnifying/minifying sub-scanning clock generator 211 is inputted to the reading-out address generating counter 407 instead of entering the horizontal synchronizing signal Hsync. Since the other portions of the monitor image memory unit 201a are similar to those of the monitor image memory unit 201 shown in FIG. 4, like parts are designated by the same reference numerals and the explanation in details thereof is herein omitted for the brevity.

Since the image forming operation of the specific area is prohibited when the original document image is sent to the masking processing unit 24 independently of the writing/reading operation of the image RAM 403, the selector 415 generates the "white" data instead of the image data corresponding to the specific area transmitted from the image selecting unit 402.

That is to say, when a trimming control signal is Low and the output signal S13 of the inverter 412 is Low, i.e., when the image data stored in the image RAM 403 is read out, the output signal of the gate 416 becomes Low and the selector 415 selects the "white" data At this time, the reading-out area setting signal to be entered in the reading-out area judging unit 408 is set to define the coordinates of the read-out area considering the difference between the magnification/minification rate of the original document image and the magnification/minification rate of the image read out of the image RAM 403. The magnifying/minifying sub-scanning clock signal S14 to be entered in the subscanning direction reading-out area judging unit 408b is set to correspond to the magnification/minification rate to be applied to the scanner 10 for scanning the original document.

Figure 10:
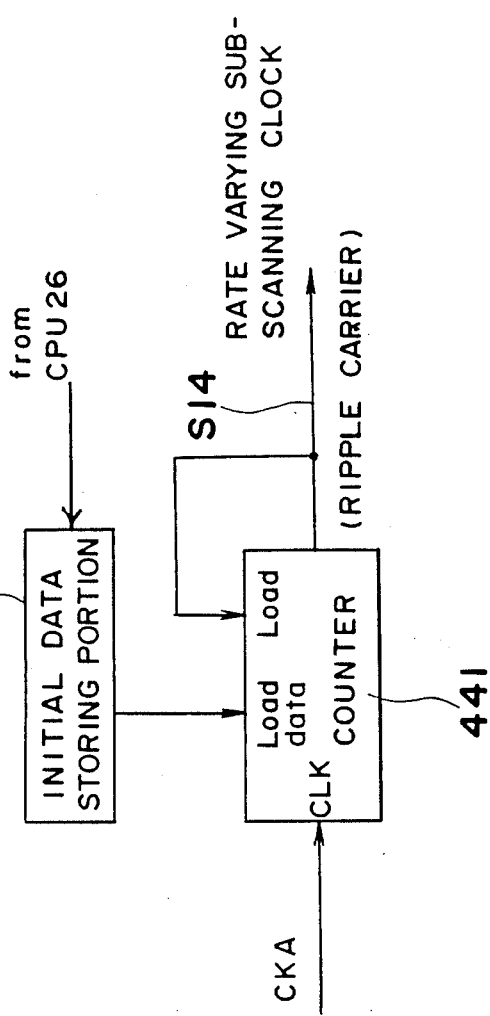
FIG. 10 is a circuit diagram showing a modulation sub-scanning clock S14 generator.

FIG. 10 is a block diagram showing the constitution of the magnifying/minifying sub-scanning clock generator 211.

The counting operation of a counter 441 is synchronized with the dot clock signal CKA transmitted from the clock generator 27 and when the count value reaches to the initialized value, the counter 441 generates a ripple carrier, which is the magnifying/minifying sub-scanning clock signal S14.

The ripple carrier is applied to the load terminal Load of the counter 441 and every time the ripple carrier is generated, the data stored in an initialized data storing unit 442 is loaded, whereby the count value of the counter 441 is initialized.

The data stored in the initial data storing unit 442 are set by the signals transmitted from the CPU 26 and a predetermined magnification/minification rate in the subscanning direction is set by the data stored in the initial data storing unit 442. If the initial count value of the counter 441 is made equal to the number of the dot clock signals CKA in one period of the horizontal synchronizing signal Hsync, the period of the magnifying/minifying subscanning clock signal S14 becomes equal to the period of the horizontal synchronizing signal Hsync.

Figure 13A:
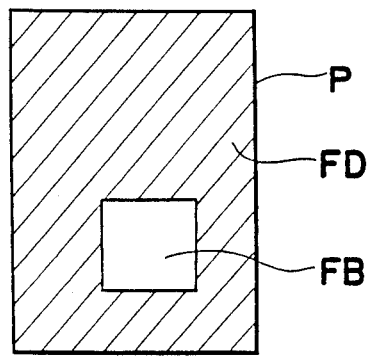
FIGS. 13 is a diagram showing image forming states when an image is formed.

In the magnifying/minifying control arrangements, when one printing process with necessary colors (within the limits of four colors) is performed for the original document image, an original document image FD is formed on the copying sheet P with a specific area EB made space as shown in FIG. 13a for example.

Figure 13B:
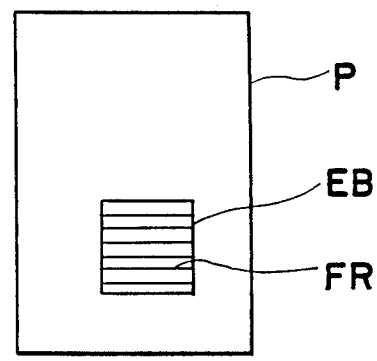

Subsequently, the image data stored in the image RAM 403 is read out under the condition of the selector 401 selecting the "white" data and the registered image FR is formed on the position on the sheet P corresponding to the specific area EB as shown in FIG. 13b.

At this time, the magnifying/minifying sub-scanning clock signal S14 is applied to the sub-scanning direction counter 407b of the reading-out address generating counter 407 and the image data read out of the image RAM 403 is magnified/minified at a predetermined rate so as to be printed on the copying sheet P.

Figure 13C:
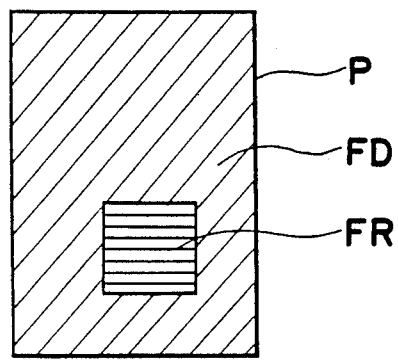

The original document image FD and the registered image FR are formed on the same one copying sheet P rolled on the surface of the transfer drum 51 so that the composed image of the original document image FD and the registered image FR is formed as shown in FIG. 13c.

The color corrections of the original document image FD and the registered image FR are independently performed respectively by the monitor picture tone setting unit 202 according to the desire the operator selects and the composed image of the images FD and FR is formed to be printed on the sheet P.

In the embodiment as described above, though the explanation is made about the case that the original document image FD and the registered image FR are printed at different magnification/minification rates respectively, when both of the magnification/minification rates for printing the images FD and FR are equal, the composed image can be formed in one time printing process without two times of the printing process.

Moreover, in the embodiment mentioned above, though the size of the specific area EB in the original document image FD which becomes a space by printing operation is made equal to that of the registered image FR, the registered image FR may be made smaller than the specific area EB in order to prevent the overlap of the two images due to the positioning error of the images formed on the sheet P.

In the embodiment, when the attention area EA is set by operating the jog dials 82 and 83 watching the display on the display unit 84 in the mosaic monitor mode, a lot of (27 in this case) mosaic monitor images GM each having different color corrections performed on the image of the attention area EA are printed in array on the one sheet P in one time printing process.

The operator selects and sets one of the images GM of which the color is nearest to the color of the original document image or of which the color the operator likes best by operating the function keys 78 to 81 so that the color correction for the subsequent copying operation is performed, whereby the color correction for the image of the entire part of the original document can be easily performed.

Accordingly, since only one time copying operation is needed for the color correction, the copying sheet and the color toner are not wasted and the time and the labor for the color correction can be reduced.

The most important portion for the color control among the image of the entire part of the original document is set to be an attention area EA, whereby the color correction of the image corresponding to the attention area EA can be performed with emphasis.

Furthermore, since the coefficients for the color correction can be automatically set by indicating the image selected among the mosaic monitor images by operating the function keys 78 to 81, the time and labor for inputting the coefficients by operating the ten keys can be saved and the mistake in setting the coefficients can be prevented.

According to the embodiment, since the image of the specific area is stored in the image RAM 403 as the image data with gradation in the super impose mode, the color correction of the image can be performed by reading out the image data from the image RAM 403. Therefore, the image data is once stored in the image RAM 403, whereby the color correction for the image can be performed after that if necessary and particularly in the case of forming the full color image, the color correction for the other image to be composed can be easily performed. Also, when the registered image is magnified/minified, the quality of the image does not become inferior as in the case of registering the image in the image RAM with two values.

In the embodiment, since the transfer drum 51 is provided, it is possible to transfer the image any time on the one copying sheet P so long as the sheet is not separated from the transfer drum 51. Therefore, in the super impose mode, it is possible to read out the image registered in the image RAM 403 many times so as to form a plurality of registered images FR on the same one sheet P and it is also possible to register another image in the image RAM 403 so as to form another registered image FR on the same sheet P, whereby the image of the entire part of the original document can be composed of more than three images.

According to the present embodiment, since the image RAM 403 is commonly used both in the mosaic monitor mode and in the super impose mode, the image RAM 403 is effectively used and the work efficiency of the resources can be improved, resulting in reduction of the cost.

According to the present invention, since the copying operation for the color correction is performed on the same one copying sheet, the waste of the sheet and the color toner can be saved and the time and the labor for the color correction can be reduced.

Moreover, the most important portion for the color control is selected among the portions of the original document image so as to be set as the specific area, whereby the color correction of the image of such an important portion can be performed with importance.

It is also possible to compose the image of the specific area to the image of the original document and the color correction can be easily performed when necessary.

Since the image memory means is in common use for controlling the color and for composing the images, the image memory means can be effectively used and the working efficiency can be improved.

What is claimed is:

1. A digital color copying machine comprising:
    image reading means for scanning an original document image and generating an image data signal corresponding to a primary color of the document image,
    color compensating means for color compensating said image data signal generated by said image reading means,
    image forming means for forming the original document image on a recording medium in response to the image data signal generated by said color compensating means,
    mode indicating means for indicating a test mode,
    area indicating means for indicating any area of the original document image,
    memory means for storing the image data signal corresponding to the area indicated by said area indicating means transmitted from the image reading means, test image signal generating means for reading out the image data signal stored in said memory means and applying it to said color compensating means a plurality of times and performing different color compensations on the indicated area by means of the color compensating means, thereby generating a test image signal when the test mode is set by said mode indicating means, and control means for controlling said image forming means in response to the test image signal generated by said test image signal generating means to form a plurality of original document images of the indicated area subjected to the different color compensation respectively on the recording medium, thereby forming a test image.

2. The copying machine according to claim 1 further comprising preparatory scanning means for scanning the original document image preparatory to forming the test image when the test mode is indicated by the mode indicating means, and display means for displaying the original document image scanned by said preparatory scanning means, wherein said area indicating means comprises position indicating means for indicating any area of the original document image displayed on said display means and operating means capable of manual operation for moving the indication position indicated by said position indicating means.

3. A copying machine as claimed in claim 1, wherein said color compensating means comprises color masking means for converting the image data signal generated from said image reading means into an image signal corresponding to a printing color and color adjusting means for performing color adjustment of a color tone on the image signal converted by said color masking means.

4. The copying machine according to claim 1, wherein said control means forms a plurality of original document images of the indicated area on which different color compensation are performed on a matrix on the same one recording medium.

5. The copying machine according to claim 1 further comprising;

image selecting means for selecting any one of the plural original document images of the indicated area which are formed as the test image on the recording medium, and means for controlling said color compensating means as to perform color compensation of the entire original document images with a color tone with which the color compensation is performed on the original document image selected by said image selecting means, thereby performing a copying operation with the selected color tone.

6. A digital color copying machine comprising:

image reading means for scanning an original document image and generating an image data signal corresponding to a primary color of the original document image, color converting means for converting the image data signal generated by said image reading means to an image data signal corresponding to a printing color, image forming means for forming the original document image on a recording medium in response to the image data signal generated by said color converting means, mode indicating means for indicating a test mode, test image forming means for performing a plurality of color converting processes with different color tones on a specific area of the original document image respectively by said color converting means, thereby forming a plurality of original document images of the specific area, each image having a different color converting process performed, in different positions on the recording medium.

7. The copying machine according to claim 6 further comprising;

preparatory scanning means for scanning the original document image preparatory to forming a test image by the test image forming means when the test mode is indicated by the mode indicating means, display means for displaying the original document image scanned by said preparatory scanning means, and area indicating means capable of manual operation for indicating said specific area on the original document image displayed by said display means.

8. The copying machine according to claim 6 further comprising:

image selecting means for selecting any one of the plural original document images of the specific area which are formed as the test image on the recording medium, and means for converting the image data signal of the entire original document image by the color converting process with the color tone performed on the original document image selected by said image selecting means, thereby performing a copying operation with a selected color tone.

9. A test printing process in a digital color copying operation comprising;

an image signal generating step of reading an image of a specific area in an original document and generating an image data signal corresponding to a primary color of the image, a storing step of storing the image data signal generated in said image signal generating step in memory means, a generating step of generating the image data signal of the specific area stored in said memory means a plurality of times, a test image signal generating step of performing color compensations with different color tones on the image data signals generated in the generating step, thereby generating a test image signal corresponding to a printing color, and a test image forming step of forming a plurality of images of the specific area each subjected to a different color compensation in different positions on the recording medium on the basis of the test image signal generated in said test image signal generating step.

10. A digital color copying machine comprising;

image reading means for scanning an original document image and generating a image data signal corresponding to a primary color of the image, color masking means for converting the image data signal generated by said image reading means into an image data signal corresponding to a printing color, color compensating means for color compensating the image data signal generated by said color masking means, mode indicating means for indicating a test mode, display means for displaying the original document image read by said image reading means when the test mode is set by said mode indicating means, area indicating means for indicating any area of the original document image displayed by said display means, memory means provided between said image reading means and said color masking means, for receiving and storing the image data signal corresponding to the area indicated by said area indicating means transmitted from the image reading means, means for reading out the image data signal stored in said memory means and applying it to said color masking means a plurality of times when the test mode is set by said mode indicating means, test image forming means for generating a test image signal by performing color compensations with different color tones with the color compensating means on the image data signals of the indicated area which are applied to the color masking means in the test mode and controlling an image forming means in response to the test image signal generated by said test image generating means and forming a plurality of original document images of the indicated area subjected to different color compensation on a corresponding recording medium, thereby forming test image, image selecting means for selecting any one of the plural images of the indicated area formed by said test image forming means, and copying means for performing color compensation of the image data signal of the entire original document image with the color tone with which the color compensation is performed on the indicated area image selected by said image selecting means, thereby performing a copying operation of the original document image.

11. The copying machine according to claim 10, wherein said color compensating means comprises;
a memory unit for storing coefficients with relation compensation of the different color tones, and
multiplier means for multiplying the image data signal from said color masking means by the coefficients stored in said memory unit, thereby performing compensation of the different color tones on the image data signal.

12. The copying machine according to claim 11, wherein said test image forming means further comprises means for rewriting the color compensation coefficients stored in said memory unit every time the image data signal of the indicated area is applied to the color masking means in the test mode.

13. A digital color copying machine comprising;
image reading means for scanning an original document image and generating an image data signal corresponding to the original document image,
color masking means for color converting the image data signal generated by said reading means into an image data signal corresponding to a printing color,
memory means provided between said image reading means and said color masking means, for storing at least one of the original document image data signal and a different original document image data signal of a specific area of the image data signal generated by said image reading means,
super imposer means for composing the image data signal stored in said memory means with the image data signal generated by said image reading means,
image forming means for forming a composed image on a recording medium on the basis of the image data signals composed by said super imposer means after they are color-converted by said color masking means.

14. The copying machine according to claim 13, wherein the color conversions of the image data signal generated by said image reading means and of the image data signal stored in said memory means are respectively performed with different color tones by said color masking means.

15. The copying machine according to claim 13 further comprising;
first copying magnificiation/minification rate indicating means for generating a first copying magnification/minification rate signal for indicating a copying magnification/minifacation rate of the image data signal generated by said reading means, and
second copying magnification/minifacation rate indicating means for generating a second copying magnification/minifacation rate signal for indicating a copying magnificiation/minifacation rate of the image data signal stored in said memory means,
wherein the composed image is formed by said image forming means on the basis of the copying magnification/minification rates indicated by said first and second copying magnification/minification rate indicating means.

16. A digital color copying machine comprising:
image reading means for scanning an original document image and generating an image data signal corresponding to the color of the image,
color converting means for color converting the image data signal generated by said image reading means into an image data signal corresponding to a printing color,
image forming means for forming the original document image on a recording medium in response to the image data signal generated by said color converting means,
test mode indicating means for indicating a test mode,
test image forming means for performing a plurality of color converting processes with different color tones on a specific area of the original document image respectively by said color converting means, thereby forming a plurality of original document images of the corresponding specific area, each image having different color conversion performed, in different positions on the corresponding recording medium,
memory means provided between said image reading means and said color converting means, for storing at least one of the original document image data signal and a different original document image data signal of a specific area of the image data signal generated by said image reading means,
super impose mode indicating means for indicating a super impose mode,
super imposer means for composing the image data signal stored in said memory means with the image data signal generated from said image reading means when said super impose mode is indicated, and composed image forming means for forming a composed image on the recording medium on the basis of the image data signals composed by said super imposer means after they are color-converted by said color converting means.

17. The copying machine according to claim 16, wherein when the super impose mode is indicated, the color conversions of the image data signal generated by the image reading means and the image data signal stored in the memory means are performed by said color converting means with different color tones, respectively.

18. The copying machine according to claim 16 further comprising;
- first copying magnification/minification rate indicating means for generating a first copying magnification/minifacation rate signal for indicating a copying magnificiation/minification rate of the image data signal generated by said reading means, and
- second copying magnification/minification rate indicating means for generating a second copying magnification/minification rate signal for indicating a copying magnification/minification rate of the image data signal stored in said memory means,
- wherein the composed image is formed by said composed image forming means on the basis of the copying magnificiation/minification rates indicated by said first and second copying magnification/minification rate indicating means when the super impose mode is indicated.

19. A digital color copying machine comprising;
- image reading means for scanning an original document image and generating an image data signal thereof,
- color masking means for color converting the image data signal generated by said image reading means into an image data signal corresponding to a printing color,
- memory means provided between said image reading means and said color masking means for storing an image data signal of a specific area in the original document image generated by said image reading means,
- test mode indicating means for indicating a test mode,
- test image forming means for reading the image data signal of the specific area out of said memory means a plurality of times and performing the color conversions of the specific area with different color tones by said color masking means, thereby forming a plurality of images of the specific area with different color tones respectively on the corresponding recording medium when the test mode is indicated by said test mode indicating means,
- super impose mode indicating means for indicating a super impose mode,
- composed area indicating means for indicating a composed area on the original document image,
- prohibiting means for prohibiting the image forming of the image data signal of the composed area indicated by said composed area indicating means and forming an image on the recording medium on the basis of the image data signal generated by said image reading means when the super impose mode is indicated, and
- composed image forming means for forming an image on the composed area on the recording medium where the image forming is prohibited by said prohibiting means, based on the image data signal stored in said memory means when the super impose mode is indicated.

20. The copying machine according to claim 19, wherein when the super impose mode is indicated, the color conversions of the image data signal generated by the image reading means and the image data signal stored in the memory means are performed by said color masking means respectively with different color tones.

21. The copying machine according to claim 19 further comprising;
- first copying magnification/minification rate indicating means for generating a first copying magnification/minification rate signal for indicating a copying magnification/minification rate of the image data signal generated by said reading means, and
- second copying magnification/minification rate indicating means for generating a second copying magnification/minification rate signal for indicating a copying magnification/minification rate of the image data signal generated by said memory means,
- wherein said prohibiting means and said composed image forming means perform the image forming operations respectively on the basis of the copying magnification/minification rates indicated by said first and second copying magnification/minification rate indicating means when the super impose mode is indicated.

22. An image recording apparatus for forming an image on a recording medium in accordance with image data which comprises:
- memory means for storing image data corresponding to a specific part image of an entire image;
- test image signal generating means for reading out the image data stored in said memory means a plurality of times and performing different color tone adjustments to the image data read out, thereby generating a test image signal corresponding to a test image which includes a plurality of said specific part images with different color tones; and
- first image forming means for forming said test image including the plurality of said specific part images on the recording medium.

23. An image recording apparatus as claimed in claim 22 further comprising:
- image selecting means for selecting any one of said plural specific part images which are formed as the test image on the recording medium; and
- second image forming means for forming the entire image on another recording medium with the color tone with which the specific part image selected by the image selecting means is formed by the first image forming means.

24. An image recording apparatus for forming an image on a recording medium in accordance with image data which comprises:
- color adjusting means for performing different color tone adjustments to the image data and generating color adjusted image data corresponding to a plurality of images, respectively, having different color tones; and
- test image forming means for forming the plurality of images respectively having different color tones in different positions of the recording medium in accordance with the color adjusted image data generated by said adjusting means.

25. An image recording apparatus as claimed in claim 24 further comprising;
  image selecting means for selecting any one of the plural images formed on the recording medium by the test image forming means; and
  means for forming an image on another recording medium with the color tone with which part image selected by the image selecting means is formed by the test image forming means.

26. An image recording apparatus for recording a color image on a recording medium in accordance with image data which comprises:
  color tone selecting means for specifying a color tone in steps; and
  color tone adjusting means for adjusting a color tone of the image data in accordance with the color tone specified by said color tone selecting means;
  wherein said color tone adjusting means includes color tone varying means for automatically varying the color tone of the image data in a stepwise fashion in accordance with the color tone specified by the color tone selecting means; and
  control means for performing recording operation in accordance with the image data of which the color tone is varied by said color tone varying means.

27. An image recording apparatus for recording an image on a recording medium in accordance with image data which comprises:
  image data processing means for processing image data by adjusting the image data;
  varying means for varying a parameter used in said calculation of said image data in a stepwise fashion; and
  image forming means for performing an image recording operation in accordance with said calculated image data synchronously with said variation of said varying means, thereby forming an image having plural parts which have been subjected to different processing by the image data processing means.

28. An image recording apparatus as claimed in claim 27 further comprising:
  selecting means for selecting any one of the parts of the image formed by said forming means; and
  means for latching the parameter used in the processing to which the selected image part has been subjected, said image recording operations performed by said processing by the image data processing means.

29. A digital color copying machine comprising:
  image reading means for scanning an original document image and generating an image data signal corresponding to the original document image;
  memory means for storing an image data signal of a specific area of the original document image generated by said image reading means;
  super imposer means for composing the image data signal stored in said memory means with the image data signal generated by said image reading means; and
  image forming means for forming a composed image on a recording medium on the basis of the image data signals composed by said super imposer means.

30. The digital color copying machine according to claim 29, further comprising:
  signal processing means for adjusting color balance of said image data signal stored in said memory means and generating an adjusted image data signal;
  said super imposer means composing the adjusted image data signal with the image data signal generated by said image reading means.

31. The digital color copying machine according to claim 29, further comprising:
  signal processing means for adjusting color balance of said image data signal stored in said memory means and generating a first adjusted image data signal, said signal processing means also adjusting color balance of said image data signal generated by said image reading means and generating a second adjusted image data signal;
  said super imposer means compose the first adjusted image data signal with the second image data signal.

32. The digital color copying machine according to claim 29, further comprising:
  signal processing means for magnifying said image data signal and generating a magnified image data signal;
  said super imposer means composing the magnified image data signal with the image data signal generated by said image reading means.

33. The digital color copying machine according to claim 29, further comprising:
  signal processing means for magnifying said image data signal stored in said memory means and generating a first magnified image data signal, said signal processing means also magnifying said image data signal generated by said image reading means and generating a second magnified image data signal;
  said super imposer means composing the first magnified image data signal with the second magnified image data signal generated by said signal processing means.

34. A digital color copying machine comprising:
  image reading means for scanning an original document image and generating an image data signal corresponding to the original document image;
  memory means for storing an image data signal of a specific area of a different original document image generated by said image reading means;
  super imposer means for composing the image data signal stored in said memory means with the image data signal generated by said image reading means;
  image forming means for forming a composed image on a recording medium on the basis of the image data signals composed by said super imposer means.

35. The digital color copying machine according to claim 34, further comprising;
  signal processing means for adjusting color balance of said image data signal stored in said memory means and generating an adjusted image data signal;
  said super imposer means composing the adjusted image data signal with the image data signal generated by said image reading means.

36. The digital color copying machine according to claim 34, further comprising:
  signal processing means for adjusting color balance of said image data signal stored in said memory means and generating a first adjusted image data signal, said signal processing means also adjusting color balance of said image data signal generated by said image reading means and generating a second adjusted image data signal;

said super imposer means composing the first adjusted image data signal with the second adjusted image data signal.

37. The digital color copying machine according to claim 34, further comprising;

signal processing means for magnifying said image data signal and generating a magnified image data signal;

said super imposer means composing the magnified image data signal with the image data signal generated by said image reading means.

38. The digital color copying machine according to claim 34, further comprising;

signal processing means for magnifying said image data signal stored in said memory means and generating a first magnified image data signal, said signal processing means also magnifying said image data signal generated by said image reading means and generating a second magnified image data signal;

said super imposer means composing the first magnified image data signal with the second magnified image data signal.

* * * * *